H. D. HUNTER.
SCRAPER FOR FURROW OPENERS.
APPLICATION FILED MAY 25, 1914.
1,129,869.
Patented Mar. 2, 1915.
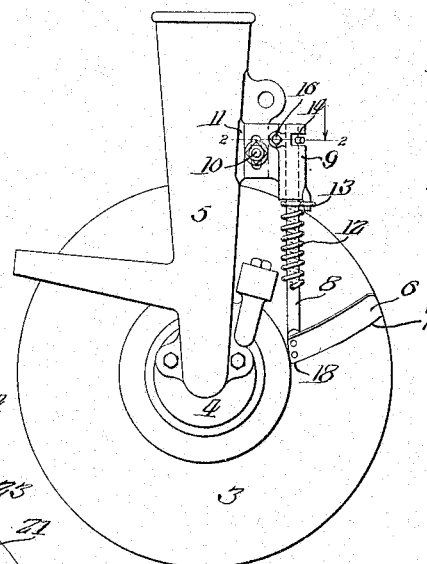
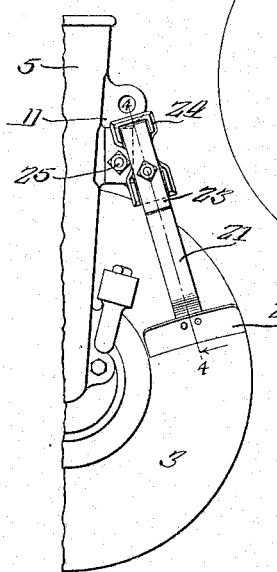
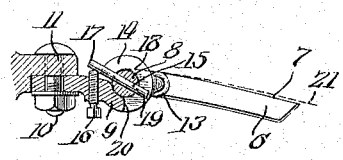
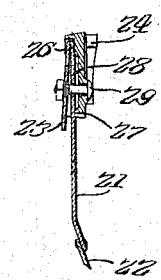
Witnesses:
Inventor:
Harry D. Hunter
By Pond & Wilson
Atty.

UNITED STATES PATENT OFFICE.

HARRY D. HUNTER, OF MARION, INDIANA, ASSIGNOR TO EMERSON-BRANTINGHAM COMPANY, OF ROCKFORD, ILLINOIS, A CORPORATION OF ILLINOIS.

SCRAPER FOR FURROW-OPENERS.

1,129,869.     Specification of Letters Patent.     Patented Mar. 2, 1915.

Application filed May 25, 1914. Serial No. 840,899.

*To all whom it may concern:*

Be it known that I, HARRY D. HUNTER, a citizen of the United States, residing at Marion, in the county of Grant and State of Indiana, have invented certain new and useful Improvements in Scrapers for Furrow-Openers, of which the following is a specification.

This invention relates to furrow openers of the single disk type such as are commonly used on grain drills, and more particularly to the scraper and the manner of mounting the same in relation to the disk.

It has heretofore been customary to maintain the scraper in operative relation to its disk by means of a spring which yieldingly holds the scraper against and in contact with the concave face of the disk. It will be obvious, however, that actual contact of the scraper with the disk is objectionable for the reason that the frictional engagement between the disk and scraper not only impedes and retards the rotation of the disk thereby increasing the draft of the machine, but also causes the scraper itself to wear rapidly thereby decreasing length of service.

One of the objects of my invention is the provision of means for yieldingly maintaining a scraper in predetermined operative relation with respect to a disk but not to any appreciable extent in actual contact with the disk so as to interfere with the rotation thereof; in other words, to yieldingly maintain a scraper with the greater portion of its scraping edge out of actual contact with but in proximity to the face of a disk.

Another object is the provision of means for adjusting the scraper to vary its proximity to the disk and also to vary the tension on the spring without correspondingly urging the scraper against the face of the disk.

In the accompanying drawings: Figure 1 is a side elevation of a drill disk furrow opener equipped with my invention. Fig. 2 is a plan sectional view taken on the line 2—2 of Fig. 1. Fig. 3 is fragmentary view similar to Fig. 1 showing another form of my invention, and Fig. 4 is a sectional view taken on the line 4—4 of Fig. 3.

From an inspection of the drawings it will be observed that I have shown a concavo-convex furrow opening disk 3 rotatably mounted in a bearing 4 attached to a seed boot 5, which is adapted to be attached to a machine frame in the usual or any preferred manner. A blade scraper 6 having a scraper edge 7 is disposed obliquely both to the horizontal and vertical axes of the disk, and is attached at its inner end to a vertically disposed rod 8 rotatably mounted at its upper end in a sleeve 9 which is adjustably attached by a bolt 10 to a lug 11 extending from boot 5. A coiled spring 12 surrounding the rod 8 has one end attached to said rod and its other end to the sleeve 9 at 13 so as to exert a torsional force upon the scraper in a direction to yieldingly urge the scraper toward the disk. The sleeve 9 has a transverse slot 14 through its upper portion to receive the opposite ends of a pin 15 extending crosswise through the rod 8, and a set-screw 16 threaded through the sleeve member forming a stop or abutment in the path of the pin 15 against which the end 17 of the pin abuts thereby limiting the rotative movement of the rod under the action of the spring 12. The scraper may be swung laterally away from the disk about its inner end 18 as a pivot, upon rotary movement of the rod 8 against the tension of the spring 12, the extent of such swinging movement being limited by contact of the end 19 of pin 15 with an end 20 of the slot 14.

In practice, if a scraper blade is maintained in engagement with a disk throughout the length of its scraping edge by a yielding force, the rotation of the disk is impeded often to the extent of stopping the disk entirely. With the above described improved structure the set-screw 16 is adjusted to maintain the scraper in such relation with the disk face that the tensional force of the spring acting upon the scraper is not received by the disk, the greater length of the scraper edge being held spaced from but in close proximity to the concave disk face. This relation is clearly illustrated in Fig. 2, in which the dotted line 21 represents the concave face of the disk. It will be apparent, therefore, that although the inner end 18 of the disk scraper edge is in contact with the disk face, the remainder of its length is slightly spaced therefrom, and that the proximity of the scraper to the disk may be varied by adjusting set-screw 16 to suit the requirements of soils of various characters and conditions.

In Figs. 3 and 4 I have illustrated another form of my invention in which I employ in lieu of the rotatable rod 8 and coiled spring 12, a spring bar or yieldable supporting member 21, upon the lower end of which the scraper blade is riveted or otherwise fixedly secured. The upper end of the member 21 is turned back upon itself as indicated by reference character 23 and is positioned in a seat formed on the outer face of a bracket 24 secured to the lug 11 of the boot 5 by a bolt 25. From Fig. 4 it will be observed that the seat in the face of bracket 24 presents two bearing portions 26 and 27 respectively separated by an intermediate depression 28. The bolt 29 by means of which the member 21 is secured to the bracket, is disposed between the bearing portions 26 and 27 so that as the bolt is tightened the member fulcrums on the bearing portion 27 to withdraw the scraper blade from the disk. By tightening or loosening the bolt 29 the proximity of the blade to the disk may be varied, and at the same time the rigidity of the member 21 may be increased or diminished as required.

It will be manifest from the foregoing that I have provided a construction which affords a positive stop to limit the approach of the scraper blade to its disk and also makes provision for adjusting the tension of the spring which yieldingly urges the scraper blade toward the disk. The practical embodiments of my invention are at present believed to be preferable forms, but it should be understood that my invention is not circumscribed by the details of construction shown as it is capable of embodiment in other forms without exceeding the scope of the appended claims.

I claim as my invention:

1. The combination of a furrow opening disk, a scraper therefor having its scraping edge extending from an inner to outer portion of a disk face and conforming to said face, the scraper being movable laterally relative to the face, and adjustable means for limiting the movement of the scraper toward the disk face to vary the proximity of said scraper to said disk face.

2. The combination of a furrow opening disk, a scraper therefor having its scraping edge extending from an inner to outer portion of a disk face and conforming to said face, means for exerting a yielding force on the scraper to hold its scraping edge in proximity to said disk face, and means for holding said scraping edge out of actual contact with said disk face against said yielding force.

3. The combination of a furrow opening disk, a scraper therefor having its scraping edge extending from an inner to outer portion of a disk face and conforming to said face, means for exerting a yielding force on the scraper to hold its scraping edge in proximity to said disk, means for positively holding the scraping edge out of actual contact with said disk face and against said yielding force, and means for varying the distance at which said scraping edge is held from the disk face.

4. The combination of a furrow opening disk, a scraper therefor, and means for holding the scraper movable toward the disk by a yielding force, for limiting such movement of the scraper so that the proximity of the scraper to the disk does not impart to the disk said yielding force, and for increasing the tension of said yielding force without increasing the proximity of the scraper with the disk.

5. The combination of a furrow opening disk, a scraper therefor, and means for holding the scraper in proximity to the disk by a yielding force and for increasing the tension of said yielding force without increasing the proximity of the scraper to the disk.

6. The combination of a furrow opening disk, a scraper therefor, means for holding the scraper in its operative position in such a manner that it is held toward the disk by a yielding force, and adjusting means for limiting the proximity of the scraper to the disk whereby the scraper may be moved toward or away from the disk and is movable at all times away therefrom against said yielding force.

7. The combination of a furrow opening disk, a scraper therefor, means for holding the scraper in its operative position so as to be movable away from the disk against a yielding force, and means for adjusting the scraper to different operative positions of varying proximity to the disk wherein the disk is movable away from the scraper against said yielding force.

8. The combination of a furrow opening disk, a scraper for the disk, a rod upon which the scraper is mounted, the rod being rotatably movable to swing the scraper toward and away from the disk, a spring exerting a yielding torsional pressure on the rod to move the scraper toward the disk, and means for limiting the rotary movement of the rod to determine the proximity of the scraper when in operative position to the disk.

9. The combination of a furrow opening disk, a scraper for the disk, a rod upon which the scraper is mounted, the rod being rotatably movable to swing the scraper toward and away from the disk, a spring exerting a yielding torsional pressure on the rod to move the scraper toward the disk, and adjustable means for limiting rotary movement of the rod in the direction to move the scraper toward the disk, whereby the proximity of the scraper when in operative position, may be varied.

10. The combination of a furrow opening disk, a scraper therefor, and means for yieldingly maintaining the scraper in proximity to the disk and for increasing the resistance of said yielding maintenance of the scraper without increasing its proximity to the disk.

11. The combination of a furrow opening disk, a scraper therefor, and means for yieldingly maintaining the scraper in proximity to the disk, for increasing the resistance of said yielding maintenance of the scraper, and simultaneously moving the scraper away from the disk.

HARRY D. HUNTER.

Witnesses:
S. T. WALLACE,
F. M. PRESNALL.

Copies of this patent may be obtained for five cents each, by addressing the "Commissioner of Patents, Washington, D. C."